(12) United States Patent
Gnanasekaran et al.

(10) Patent No.: US 8,767,561 B2
(45) Date of Patent: *Jul. 1, 2014

(54) MANAGEABILITY TOOLS FOR LOSSLESS NETWORKS

(71) Applicant: Brocade Communications Systems, Inc., San Jose, CA (US)

(72) Inventors: Sathish Kumar Gnanasekaran, Sunnyvale, CA (US); Rishi Sinha, San Jose, CA (US); Michael Gee, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,771

(22) Filed: Jun. 28, 2013

(65) Prior Publication Data

US 2013/0286858 A1 Oct. 31, 2013

Related U.S. Application Data

(63) Continuation of application No. 12/881,949, filed on Sep. 14, 2010, now Pat. No. 8,498,213.

(51) Int. Cl.
H04J 3/14 (2006.01)
H04L 12/28 (2006.01)

(52) U.S. Cl.
USPC ............ 370/242; 370/248; 370/252; 370/412

(58) Field of Classification Search
None
See application file for complete search history.

(56) References Cited

U.S. PATENT DOCUMENTS

| | | | |
|---|---|---|---|
| 6,947,380 B1 | 9/2005 | Yip et al. |
| 7,899,893 B2 | 3/2011 | Taylor |
| 7,974,289 B2 | 7/2011 | Shimonishi |
| 7,978,628 B2 | 7/2011 | Bugenhagen |
| 2001/0036157 A1 | 11/2001 | Blanc et al. |
| 2003/0031130 A1 | 2/2003 | Vanghi |
| 2003/0051049 A1 | 3/2003 | Noy et al. |
| 2004/0066743 A1 | 4/2004 | Shimojo et al. |
| 2005/0018601 A1 | 1/2005 | Kalkunte et al. |
| 2005/0043925 A1 | 2/2005 | Hepner et al. |
| 2005/0108444 A1 | 5/2005 | Flauaus et al. |
| 2005/0141429 A1 | 6/2005 | Jayakrishnan et al. |
| 2005/0268152 A1 | 12/2005 | Yamaguchi et al. |
| 2007/0171914 A1 | 7/2007 | Kadambi et al. |
| 2008/0219168 A1 | 9/2008 | Enomoto et al. |
| 2010/0030785 A1 | 2/2010 | Wilson et al. |
| 2010/0077178 A1 | 3/2010 | Crosetto |
| 2010/0091792 A1 | 4/2010 | Sasaki et al. |
| 2011/0211827 A1 | 9/2011 | Soto et al. |
| 2012/0008502 A1 | 1/2012 | Kadambi et al. |
| 2012/0014253 A1 | 1/2012 | Rongong et al. |

*Primary Examiner* — Andrew Lee

(74) *Attorney, Agent, or Firm* — Wong, Cabello, Lutsch, Rutherford & Brucculeri, L.L.P.

(57) ABSTRACT

Manageability tools are provided for allowing an administrator to have better control over switches in a lossless network of switches. These tools provide the ability to detect slow drain and congestion bottlenecks, detect stuck virtual channels and loss of credits, while hold times on edge ASICs to be different from hold times encore ASICs, and mitigate severe latency bottlenecks.

21 Claims, 14 Drawing Sheets

MANAGEABILITY TOOLS FOR LOSSLESS NETWORKS

CROSS-REFERENCE TO RELATED APPLICATIONS

This application is a continuation of U.S. patent application Ser. No. 12/881,949, filed Sep. 14, 2010, titled "Manageability Tools for Lossless Networks", the entire contents of which is incorporated herein by reference for all purposes.

TECHNICAL FIELD

The present invention relates to the field of computer networking, and in particular to manageability tools for lossless networks.

BACKGROUND ART

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Typically, hosts and storage devices (generically, devices) connect to switches through a link between the device and the switch, with a node port (N_port) of the device connected to one end of the link and a fabric port (F_port) of a switch connected to the other end of the link. The N_port describes the capability of the port as an associated device to participate in the fabric topology. Similarly, the F_port describes the capability of the port as an associated switch.

Over time, SANs have become more complex, with fabrics involving multiple switches that use inter-switch links (ISLs) connected to switch ports (E_ports) on the switches. In some SANs, a core group of switches may provide backbone switching for fabric interconnectivity, with few or no devices directly connected to the core switches, while a number of edge switches provide connection points for the devices or devices of the SAN. Additional layers of switches may also exist between the edge switches and the core switches.

As networks have become more complex, the need for improved manageability and control over those networks has increased. When a network administrator notices one or more applications running on the SAN fabric are slowing down, the administrator needs tools to detect and possibly correct problems in the fabric.

SUMMARY OF INVENTION

In one embodiment, a network switch is disclosed. The network switch comprises an application specific integrated circuit (ASIC) comprising a port configured to transmit data; a processor, coupled to the ASIC; and software, executed by the processor. The software comprises logic to detect a stuck virtual channel associated with the port; and logic to report the stuck virtual channel.

In another embodiment, a method is disclosed. The method comprises detecting a stuck virtual channel and reporting the stuck virtual channel.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
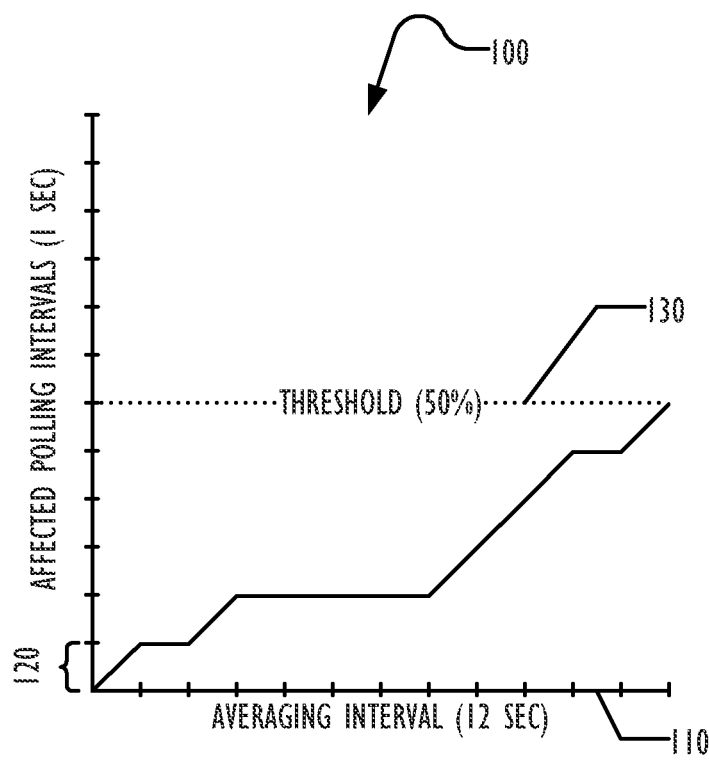
FIG. 1 is a graph illustrating measurement of bottlenecking according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is written in terms of a Fibre Channel (FC) fabric, the techniques described herein are not limited to Fibre Channel fabrics, but may be used for Fibre Channel over Ethernet (FCoE) and other lossless networks, such as Ethernet-based networks that are being proposed by the IEEE Data Center Bridging working group. Similarly, although the following description is written in terms of transmission credits, similar techniques may be used with other protocols developed for pause flow control of a communication link.

There are numerous kinds of problems that an administrator may desire to detect in a SAN fabric. These problems may include bottlenecks, "stuck" virtual channels, loss of buffer credits, and latency problems that may spread from edges of a fabric up to the core or fabric-wide. Embodiments of manageability tools disclosed herein allow administrators to detect and in some cases correct or mitigate those problems.

Before delving into the details of these embodiments, some terminology should be explained. A bottleneck is a port in a fabric where frames are not able to get through as fast as desired, so that the offered load is greater than the achieved throughput. This state is time varying, not a fixed property of a port.

There are two types of bottlenecks in which mismatches between offer load and achieved throughput can arise. Congestion occurs when the offered load exceeds the physical capacity of the channel, even though the offered load does not exceed the rate at which the other end of the channel can continuously accept traffic. Alternately, a slow drain occurs when the offered load exceeds the rate which the other end of the channel can continuously accept traffic, even though the offered load does not exceed the physical capacity of the channel. Slow drain bottlenecks are also referred to as latency bottlenecks. Recognition of this distinction is important, because a congestion bottleneck problem typically requires a different solution than a bottleneck problem caused by a slow drain. For example, increasing the ability of the other end to accept traffic will not help if the problem is congestion, and increasing the physical capacity of the channel will not help if the problem is a slow drain.

Slow Drain and Congestion Bottleneck Detection

In one embodiment, a slow drain detection technique allows alerting an administrator when a slow drain bottleneck occurs on a port. When enabled, the slow drain detection technique may signal an alert in one of several ways, including writing a message to a log file, responding to a command line interface (CLI) spot check, and generating simple network management protocol (SNMP) traps that can be processed by an SNMP monitoring system. Some embodiments may provide some or all of these alerting techniques. These ways of alerting the administrator are illustrative and by way of example only, and other techniques for signaling the detection of a slow drain may be used. The embodiments disclosed herein do not depend on what is connected at the other end of the channel, but only on data that may be generated and analyzed at the "near" end of the channel where detection and alerting occurs.

In one embodiment, in which buffer credits are used for flow control, an assumption is made that no credit deficiency or loss of credits occurs at the port where bottleneck detection is desired. Thus, the port has sufficient credits for the bandwidth-delay product of the cable or link that forms the channel. Embodiments of a slow drain detection technique cannot distinguish between credit deficiency and a slow-draining device if either may exist on a port with bottleneck detection enabled. The effect of both conditions appears the same, and both will trigger the detection mechanism.

In one embodiment, bottleneck detection may be enabled on a port-by-port basis. In one example, the administrator notices one or more applications running on the SAN fabric slowing down and would like to determine whether there are any slow-draining devices attached to the fabric, and where. The administrator may enable slow-drain detection on each of the suspected F_ports of the edge switches. In one embodiment, the administrator may configure alert parameters for the slow-drain detection technique, such as severity and duration. If the slow-drain detection mechanism generates alerts for one or more F_ports, the administrator may check those F_ports for more detailed information if desired, confirming that reported statistics do show a slow drain of a severity above a predetermined threshold. The administrator has now been alerted to device latency in the fabric.

The slow-drain detection technique in one embodiment merely alerts the administrator, taking no automatic corrective actions. The most likely response by the administrator would be for the administrator to investigate the fabric resource allocation that creates the stress, such as a large number of real or virtual machines creating a large workload for the other end device. In such a situation, the administrator may investigate and optimize the resource allocation, using any techniques known to the art, for example determining which flows are destined to the F_port using zone setup or other management tools. In embodiments described below, however, a bottleneck mitigation technique may be provided to automatically take corrective actions when enabled.

If enabling slow-drain detection does not result in the generation of alerts, the administrator may choose to spot check individual F_ports using a CLI or other interface, and confirm that the reported statistics show a below-threshold severity, eliminating slow-drain bottlenecks as the source of the reported problems with fabric slowness.

In one embodiment, slow drain severity may be measured as the fraction or percentage of time in a given window when the port was experiencing slow drain.

In one embodiment, slow drain detection is implemented in software or firmware that checks variable values that are automatically collected by the hardware, typically an application specific integrated circuit (ASIC) such as is described below and in FIG. 8. The mechanism is to check for the following condition: (1) there are frames waiting for transmission, and (2) the transmission credit for that port is 0. When this condition is true, even for a very brief interval, the channel is a slow drain bottleneck. This condition may appear and disappear over time on the channel.

For every port on which slow-drain detection is enabled, the software may poll the ASIC for that port to measure the number of seconds the port is affected by the slow drain (the "severity") over a period of time (the "averaging interval"). In one embodiment, an "affected" second is one in which the above slow-drain condition was detected as true for a predetermined portion of a second, such as five percent (5%) or fifteen percent (15%) of that second. In one embodiment, the predetermined portion of the second may be configurable by the administrator. In another embodiment, a different criterion may be used for determining whether a second in the averaging interval is affected by slow-drain bottlenecking. In this embodiment, 2 additional parameters are used: (1) a transmission credit to zero ratio, and (2) an inter-frame time ratio. In one embodiment, a default value for the transmission credit to zero ratio is 0.8 and a default value for the inter-frame time ratio is 50, but these values are illustrative and by way of example only. These criteria are illustrative and by way of example only, and other criteria may be used to determine that a slow-drain bottleneck has developed.

In the latter embodiment, a second is considered affected by slow-drain bottlenecking if (1) a transmission credit to zero counter, which counts the number of times the transmission credit for that port has gone to 0, has been incremented by a number greater than or equal to a transmission credit zero ratio times the maximum number of increments in one second; and (2) the observed inter-frame time (in one embodiment measured by the ASIC) is greater than or equal to the inter-frame time ratio times a theoretical inter-frame time for full throughput at the observed frame size. This criterion means that a second will only be considered affected when the backpressure in that channel is high enough to be of concern.

The measurement of the percentage of affected seconds is then compared against the threshold to determine whether to generate alerts reporting that the port is bottlenecked. FIG. 1 is a graph 100 illustrating an example averaging interval 110 and a threshold 130. In this example, the averaging interval 110 is 12 seconds long. There are 6 1-second polling intervals 120 affected by bottlenecking on the port during this interval. Thus, the value reported for these 12 seconds is fifty percent (50%). Bottleneck determination is based on a moving average of the number of seconds affected by bottlenecking in the port over the averaging interval 110.

In one embodiment, the averaging interval 110 and the threshold value 130 are user configurable. In a further embodiment, the percentage of a second during which the slow drain condition was detected true may also be configurable, defaulting to a default value such as five percent (5%).

The averaging interval 110 cannot be less than the polling interval 120. Preferably, the software polls the ASIC multiple times during the polling interval 120. By polling multiple times during the averaging interval, the software can calculate a moving average, which updates more frequently than a simple average, and can report fine-grained variation within the averaging interval for visualization or other analysis by the user.

In one embodiment, the software is implemented by a daemon of the operating system of the switch, which may also provide other manageability tools such as are described below. An application programming interface (API) may be defined for the software to allow application access to the bottleneck detection information such as the severity and duration of the bottleneck.

Figure 9:
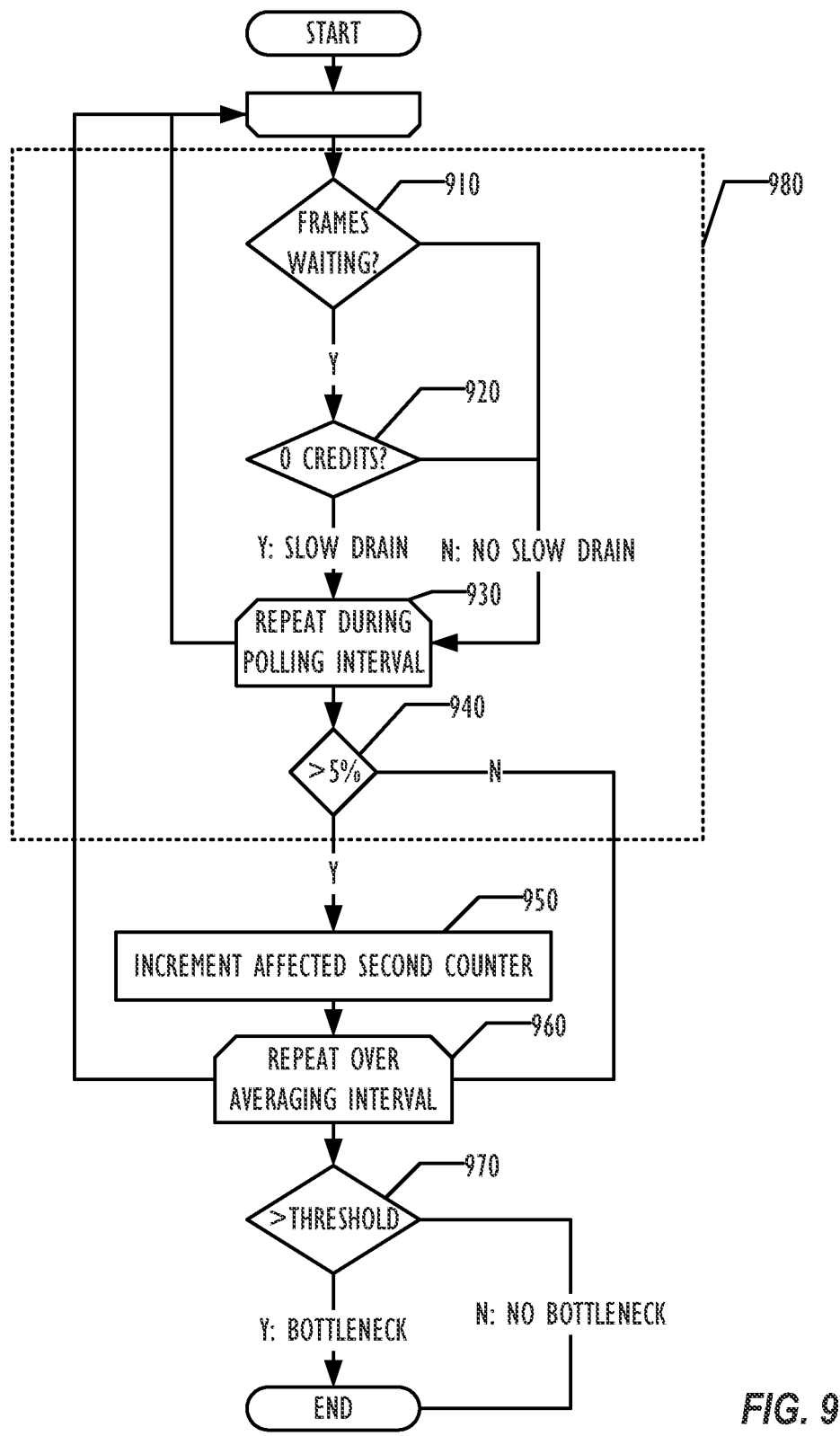
FIG. 9 is a flowchart illustrating a technique for detecting a slow drain bottleneck by software with hardware assistance according to one embodiment.

FIG. 9 is a flowchart illustrating a technique for detecting a slow drain bottleneck by software with hardware assistance according to one embodiment. In block 910, the software polls the ASIC to determine whether any frames are waiting transmission. If yes, then in block 920, the software polls the ASIC to determine if 0 credits are available. If so, then that polling cycle indicates a slow drain exists. If either block 910 or block 920 is a no, then that polling cycle indicates no slow drain exists.

Block 910 and 920 are repeated in block 930 for a predetermined number of times per second. In block 940, if a slow drain existed at greater than 5% (or other predetermined portion) of the second or other polling interval, then an affected second counter is incremented in block 950 and blocks 910-950 are repeated in block 960 over an averaging interval. In block 970, if the number of affected seconds exceeds a threshold value, then a slow drain bottleneck has been detected.

Figure 10:
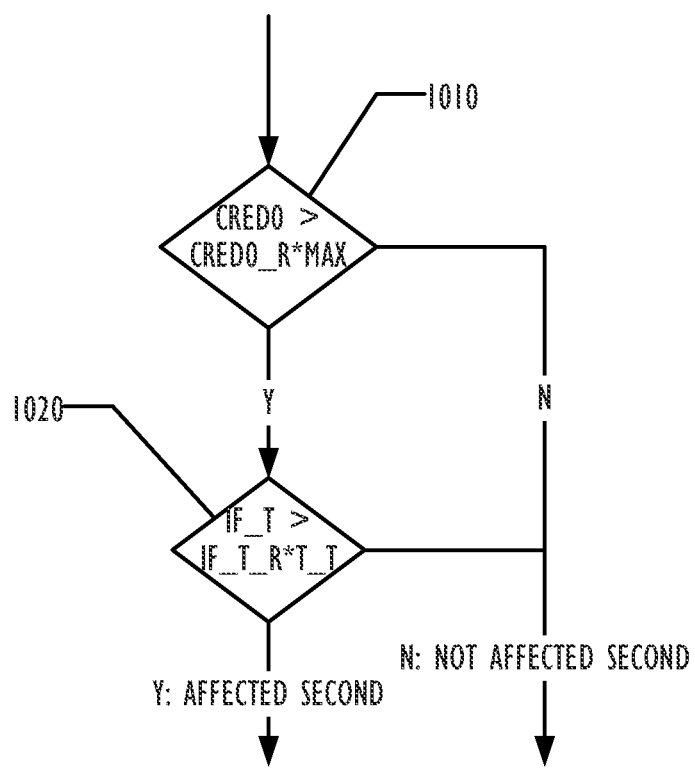
FIG. 10 is a flowchart illustrating another embodiment of a portion of the flowchart of FIG. 9.

Dashed line 980 indicates that blocks 910-940 may be replaced in other embodiments, such as the one illustrated in FIG. 10. In this embodiment, in block 1010 a transmission credit to 0 counter, maintained by counter logic 862 as illustrated in FIG. 8, is compared to a transmission credit to 0 ratio multiplied by a theoretical number of increments. If the transmission credit to 0 counter exceeds that value, then in block 1020 and inter-frame time is compared to an inter-framed time ratio times a theoretical inter-frame time at full throughput.

If the inter-frame time exceeds that value, then the second may be considered an affected second. The new the him and him and him and him and him and him and him Otherwise, the second is considered not to be an affected second.

In one embodiment, the bottleneck detection feature is controlled by a CLI interface that may allow the administrator to enable and disable bottleneck detection on a port and may provide other features such as showing the slow-drain statistics that are collected on each port, controlling whether and how often alerts may be generated, such as by specifying a minimum number of seconds between consecutive alerts, and showing a list of ports for which bottleneck detection is enabled. In one embodiment, the collected statistics are kept for a predetermined time, such as 3 hours, to allow retrospective analysis.

In one embodiment, the severity and other information described above may be reported in the alerts, as well as the existence of the slow drain bottleneck. By doing so, information about the severity of the slow drain, for example, may be reported to an appropriate point in the fabric, allowing mitigation to be performed not only at the point of detection, but at some other desired point in the fabric.

Alerts may be generated in multiple ways according to various embodiments, and may be formatted in any desired way, including in a structured format such as an extended markup language (XML) format.

Some embodiments may provide access control features that control access to the interface for controlling bottleneck detection, including role-based access control features.

The above description is written in terms of detecting slow-drain bottlenecks on F_ports. In one embodiment in some embodiments, both F_port and E_ports may be monitored for slow-drain bottlenecks using the techniques described above. Slow drains on E_ports may result from various conditions, including downstream bottlenecking, credit deficiency on long-distance links, and unknown hardware issues.

Although the above description is written assuming slow-drain bottleneck detection is enabled on a port-by-port basis, other embodiments may enable detection on a fabric-wide basis, including both F_ports and E_ports, and may further include detection of congestion bottlenecks in addition to slow-drain bottlenecks. In this embodiment, all F_port and E_ports may be enabled or disabled at once for the entire switch.

In a further embodiment, individual ports may be excluded from bottleneck detection, for example, when a long-distance port is known to be a bottleneck because of credit insufficiency. Where detection is enabled or disabled on a switch basis, not a port basis, in some embodiments event-based reporting of detecting bottlenecks may be controlled by a set of per port configuration parameters, with default values provided by the firmware. The default values may be changed for the entire switch at the time of enabling, and on a per-port basis after enabling.

In one embodiment, one of the configuration parameters allows disabling alert reporting. Bottlenecks are still detected and history information is collected and displayable, but alerts are not generated. This contrasts with exclusion of a port from detection, which disables detection of bottlenecks and the collection of history information.

In one embodiment, in addition to detection of slow-drain bottlenecks as described above, the system detects and reports congestion bottlenecks. Congestion bottlenecks indicate a problem that typically requires provisioning additional resources in the fabric.

In an embodiment in which the ASIC provides specific hardware to check for congestion bottlenecking, that hardware may be used. Otherwise, the port may be considered bottlenecked if the link utilization is greater than or equal to a threshold value, such as 95%. The firmware polls the ASIC every second to get the link utilization that port for that second. Reaching the threshold indicates that the second is affected by congestion bottlenecking, so that there is back pressure going upstream from this port. As with slow-drain bottlenecking, the averaging interval 120 and the threshold 130, both of which may be configurable and have default values, may be used to control generation of alerts when the number of affected seconds reaches the threshold 130.

Figure 2:
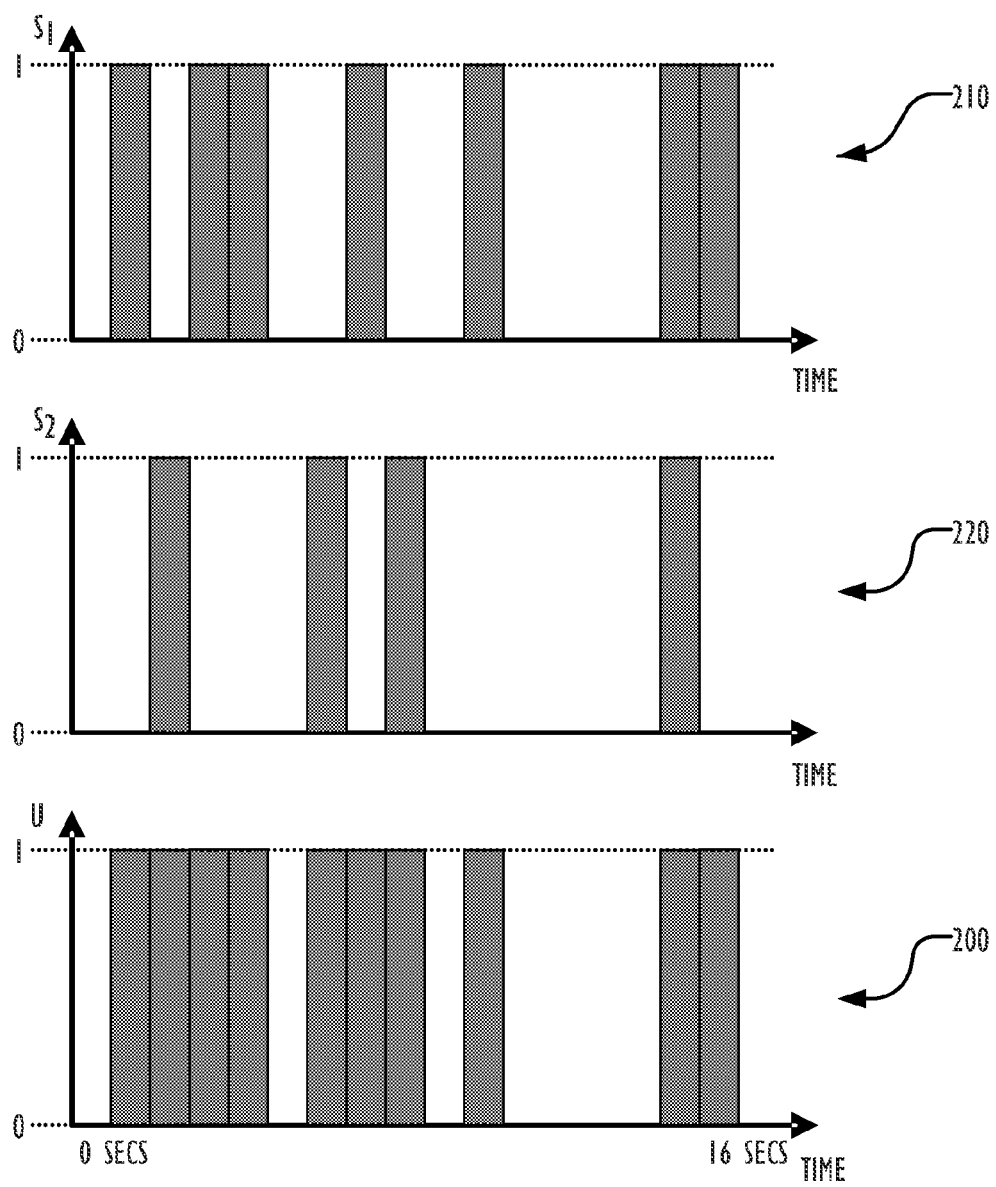
FIG. 2 is a graph illustrating the union of multiple statistical measures according to one embodiment.

In one embodiment, in addition to providing displayable statistics for individual ports, a user interface may provide information for an entire switch, combined as the union of the port specific statistics. FIG. 2 is a graph illustrating this concept. Assume that in each second statistics $S_1$ (210) and $S_2$ (220) may have the value 0 or 1. FIG. 2 shows how the union U (200) of the statistics may vary over the 16-second intervals shown. The union U is 1 if either $S_1$ or $S_2$ is 1 and a 0 otherwise. If a 16-second averaging interval 120 is used, the reported values for $S_1$ (210) $S_2$ (220), and U (200) over these 16 seconds is 7/16 (=0.44), 4/16 (=0.25), and 10/16 (0.63), respectively.

In embodiments that may detect bottlenecks on E_ports, special handling may be provided for trunks that combine multiple links. Slow-drain bottlenecks are considered a property of the master port for the trunk only, but congestion bottlenecks are a property determined for the entire trunk, although the bottleneck may be reported on the master port only. In embodiments using port-by-port enabling and disabling, only the master port may be enabled for bottleneck detection. In embodiments using switch-wide enabling, a trunk slave port may not be excluded.

In some embodiments, where the switch is an FC switch, both FC and FCoE ports may be supported for bottleneck detection. Because bottleneck detection applies to traffic egressing a port, on FCoE ports, bottleneck detection may apply only to traffic going from the FC side to the converged enhanced Ethernet (CEE) side, not to the traffic coming from the CEE side to the FC side.

In one embodiment, the physical network switch may be partitioned into multiple logical switches, and logical fabrics may be formed from logical switches. In such an embodiment, enabling and disabling of bottleneck detection may be performed on logical ports of logical switches, in addition to physical ports. Switch-wide enabling and disabling may in some embodiments be provided on a logical switch basis, and for a logical fabric where bottleneck detection is desired, the feature may be enabled separately on each logical switch in the logical fabric. In embodiments where a base switch may provide an extended inter-switch Link (XISL) for transporting traffic between logical switches that may be shared by multiple logical fabrics, bottlenecks in a base fabric logical switch may be caused by a mixture of traffic from multiple logical fabrics, and the administrator may not be able to determine from the bottleneck detection alerts and statistics which logical fabric (or which plurality of logical fabrics) may be causing the bottleneck.

In one embodiment, bottleneck detection may be performed on physical or logical F_ports, and physical E_ports, but may not be performed on logical E_ports.

Figure 3:
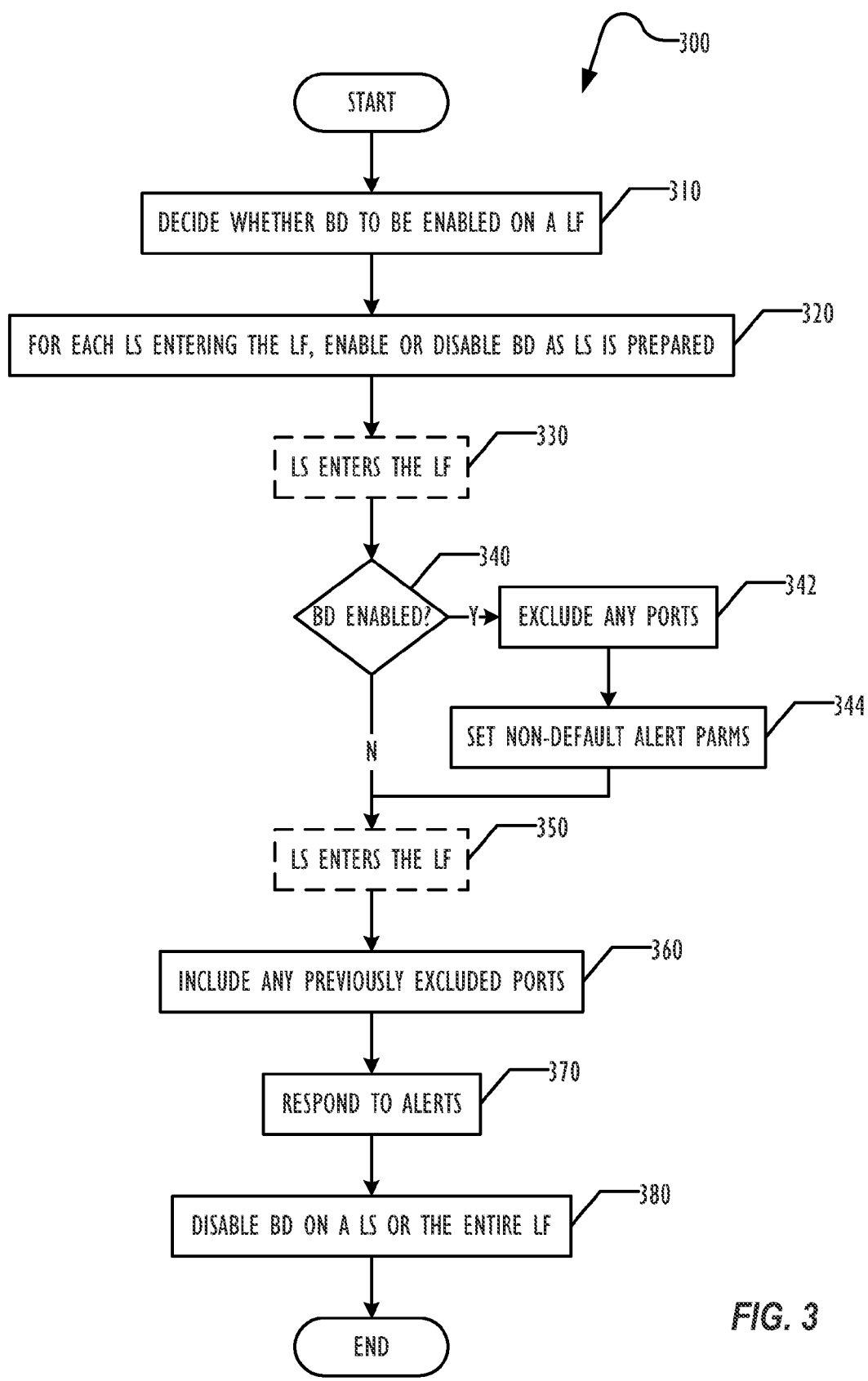
FIG. 3 is a flowchart of a workflow for bottleneck detection according to one embodiment.

FIG. 3 is a flowchart illustrating a workflow 300 for using bottleneck detection in a logical fabric. In block 310, with user determines whether bottleneck detection is to be enabled in a logical fabric. In block 320, for each logical switch entering the logical fabric, the user enables or disables the bottleneck detection at the time the logical switch is prepared. The logical switch may enter the logical fabric in block 330 or in block 350. In block 340, if bottleneck detection is enabled for the logical switch, the user excludes in block 342 any ports to be excluded from bottleneck detection. In block 344, the user configures any non-default alerting parameters for the logical switch. If the logical switch did not enter the logical fabric in block 330, it does so in block 350. The user may then include any previously excluded ports in block 360. As alerts occur, the user may respond in block 370, and may spot-check ports of interest. Finally, the user in block 380 determines if this logical switch or the whole logical fabric should have bottleneck detection disabled, and disables the feature if desired, on each logical switch in the logical fabric if the feature is to be disabled on the logical fabric.

In one embodiment, if the port is added to a logical switch after bottleneck detection is enabled for a logical switch, the newly added port is automatically enabled for bottleneck detection without user interaction.

In one embodiment, where slow drain and congestion bottleneck detection are both available, configuration parameters such as the threshold for generating alerts may be separately configured for slow drain and congestion bottlenecking.

Once slow drain bottlenecks are detected by the slow drain bottleneck detection techniques described above, in addition to alerting an administrator of the switch, manageability tools such as are described below may allow for mitigation of the bottleneck, which may negatively affect the flow with the slow drain, but decrease the effect of the slow drain on other flows through the fabric.

Detection of Stuck Virtual Channels

Another manageability tool for administrators relates to stuck virtual channels. Virtual channels allow providing multiple independent flows through a single physical or logical port connected to a common ISL, as if the single port were divided into a plurality of sub-ports. In some embodiments, each virtual channel maintains its own resources for managing the flow across that virtual channel, including input/output queues, timers, counters, and flow control mechanisms such as transmit/receive credits. For additional discussion of virtual channels, see U.S. Patent Publication No. 20070127366 A1, entitled "Quality of Service Using Virtual Channel Translation," which is incorporated herein by reference in its entirety for all purposes. The term virtual channel may also be used when referring to the lanes in 40G or 100G Ethernet links. A VC as used herein is not a form of trunking by aggregating multiple physical links into a single logical link, but a form a subdividing a physical port (and its associated traffic) into multiple independent flows.

Figure 4:
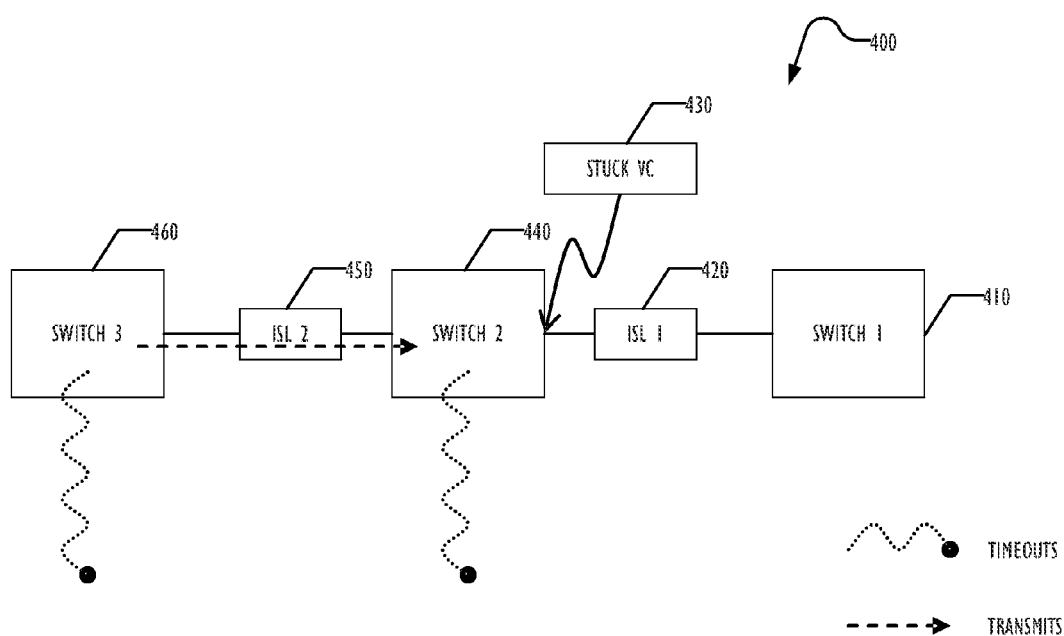
FIG. 4 is a block diagram of a switched network experiencing a stuck virtual channel according to one embodiment.

FIG. 4 is a block diagram of a fabric illustrating the problem detected by a stuck virtual detection tool according to one embodiment. In this fabric, each virtual channel maintains its credits independently. Assume that the transmit credit for virtual channel 430 permanently goes down to 0 at the E_port of switch 440. This should not happen in normal operation, but may occur because of abnormal events. An administrator would like to detect such an occurrence.

At inter-switch link (ISL) 450, when ISL 420 has a stuck virtual channel, switch 460 will use all of its credits for the stuck virtual channel to send frames via ISL 450 to switch 440, which will not forward any frames to switch 410. Frames will therefore timeout at switch 440, which will send VC_RDY credit returns back from switch 440 to switch 460. At that point, switch 460 again transmits frames to switch 440, again exhausting all of its credits for this virtual channel. Switch 460 may also experience timeouts, around the same time as switch 440, because the difference in age between the frames at the two switches is likely to be very small. Therefore, the virtual channel 420 appears stuck at ISL 450 as well, with the exception of the few frames that it carries when frames time out at switch 440. In this situation, ISL 420 has a primary stuck virtual channel condition, and ISL 450 has a dependent stuck virtual channel condition. The only difference between the two conditions is the occasional transmission of frames at the dependent stuck virtual channel port, compared to the complete absence of transmission at the primary stuck virtual channel port. Determining the difference between a primary and a dependent stuck VC is useful, because mitigation of a secondary stuck VC will not solve the underlying problem at the primary stuck VC.

Stuck virtual channel (VC) detection according to the embodiments described herein finds stuck VCs throughout the fabric, determining the key ports and VC for each stuck VC. In one embodiment, a stuck VC detection mechanism does not distinguish between primary and dependent stuck VC conditions and reports both. Stuck VC detection may report the stuck VC through alerts, such as by writing a message to a log file or by generating an SNMP trap.

An assumption is made that the hold time (the maximum time a frame is held by an ASIC) at F_ports is not greater than the hold time that E_ports. If the F_port hold time exceeds the E_port hold time, a slow device connected to the F_port may cause E_ports to look like primary stuck VCs. A stuck VC cannot be detected when there is no traffic attempting to go out on the stuck VC.

In one embodiment, the stuck VC detection mechanism is an extension to bottleneck detection and resides in the daemon of the fabric operating system that provides bottleneck detection. In other embodiments, stuck VC detection may be implemented in another daemon or module of the fabric operating system.

In one embodiment, stuck VC detection is automatically enabled, and all E_ports are monitored all the time for stuck VCs, reporting upon detection of a stuck VC. Other embodiments may allow for disabling and enabling stuck VC detection under user control, using a configuration file, a CLI interface, or any other desired control technique.

In one embodiment, alert messages may be throttled to prevent a flood of messages from a stuck VC, such as limiting messages to one per 5 minutes per port. In one embodiment, the throttling mechanism may allow user control over the throttling rate. Because throttling is on a per-port basis, multiple messages may be generated in a single 5 minute period, if they are from different ports.

As described above, each VC maintains its own transmission credit counter that keeps track of the available transmission credits for each VC. In one embodiment, the ASIC provides a counter for the number of bytes transmitted on each VC. In this embodiment, a stuck VC may be detected when 0 bytes are transmitted on the VC over the observation period and the transmission credit counter is 0 at the end of the observation period. The observation period would have to be greater than the hold time. A port with a dependent stuck VC would not satisfy this condition, because it would transmit frames once every hold time period. Therefore, this embodiment would detect only the primary stuck VC port, which is generally preferable.

Figure 11:
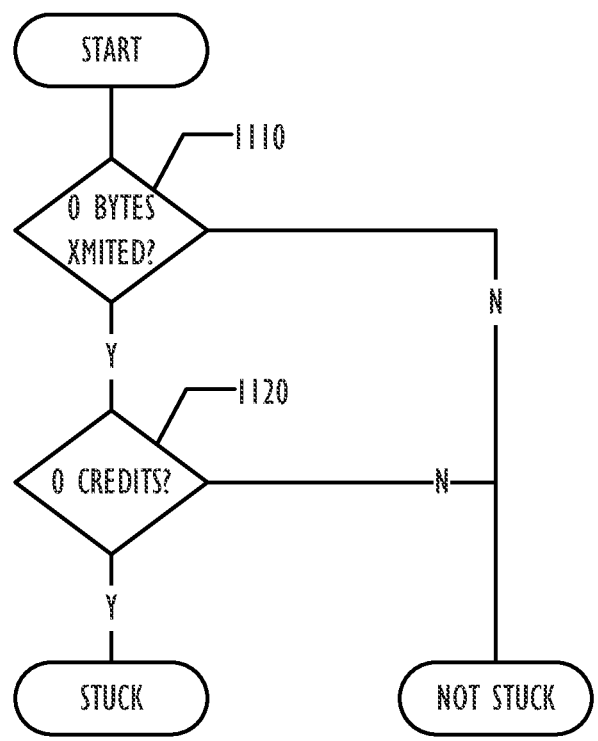
FIG. 11 is a flowchart illustrating a technique for detecting stuck virtual channels according to one embodiment.

FIG. 11 is a flowchart illustrating such an embodiment. In block 1110, the software checks the counter of number of bytes transmitted on the VC. If any bytes were transmitted, then the VC is not stuck. It is 0 bytes were transmitted, then in block 1120, the software may check whether 0 credits remain. If no credits remain available, the VC is stuck.

In embodiments where the ASIC does not have a per-VC transmit counter, a software detection technique may detect both primary and secondary stuck VC ports, using a "congestion counter" provided by the ASIC, also referred to herein as a transmission credit to zero counter.

Every VC 0-15 as a transmission credit to zero counter at every ASIC logical port. This counter increments when the VC has at least one frame waiting for transmission and its transmission credit counter is 0. In one embodiment, increments to the transmission credit to zero counter are done by the ASIC on clock ticks. In some embodiments, the tick interval may be programmable within a range of values such as 0.81 μs to 25.90 μs.

The ASIC may also provide a suppression time on top of the transmission credit zero counter logic to suppress the incrementation of the counter for a predetermined time, every time the underlying condition transitions from false to true. In one embodiment, the suppression time is programmable within a range of values, such as 0.5 μs to 31.5 μs. Where the suppression time is available, the stuck VC condition also includes the condition that the suppression time must have elapsed.

A stuck VC almost always has frames waiting and 0 transmission credits, combined with an elapsed suppression time condition. On the primary stuck VC, the condition is not true if and when all of the frames queued for transmission get dropped at the same time, which is quite likely, and the frame-waiting condition is not satisfied. In a dependent stuck VC, the combined issue condition may not be true for a short while after the dependent stuck VC transmits a frame to the primary, because during this time the suppression time has not elapsed. Therefore, except for these short periods, the transmission credit zero counter goes up continuously on a primary or dependent stuck VC. Software for stuck VC detection may use the magnitude of the counter value as a test for stuck VC. A very high value of the counter, approaching the maximum possible a second, may be considered an indication of a stuck VC, causing the generation of an alert.

In a further embodiment, the transmission credit to zero counter for a VC is reset whenever the VC does not satisfy the frames waiting and 0 transmission credits condition at the next clock tick. Thus by monitoring the transmission credit to zero counter over a period of time at least as long as the hold time, a primary stuck VC may be distinguished from a secondary stuck VC by detecting that the counter continuously increments, without being occasionally reset.

Figure 12:
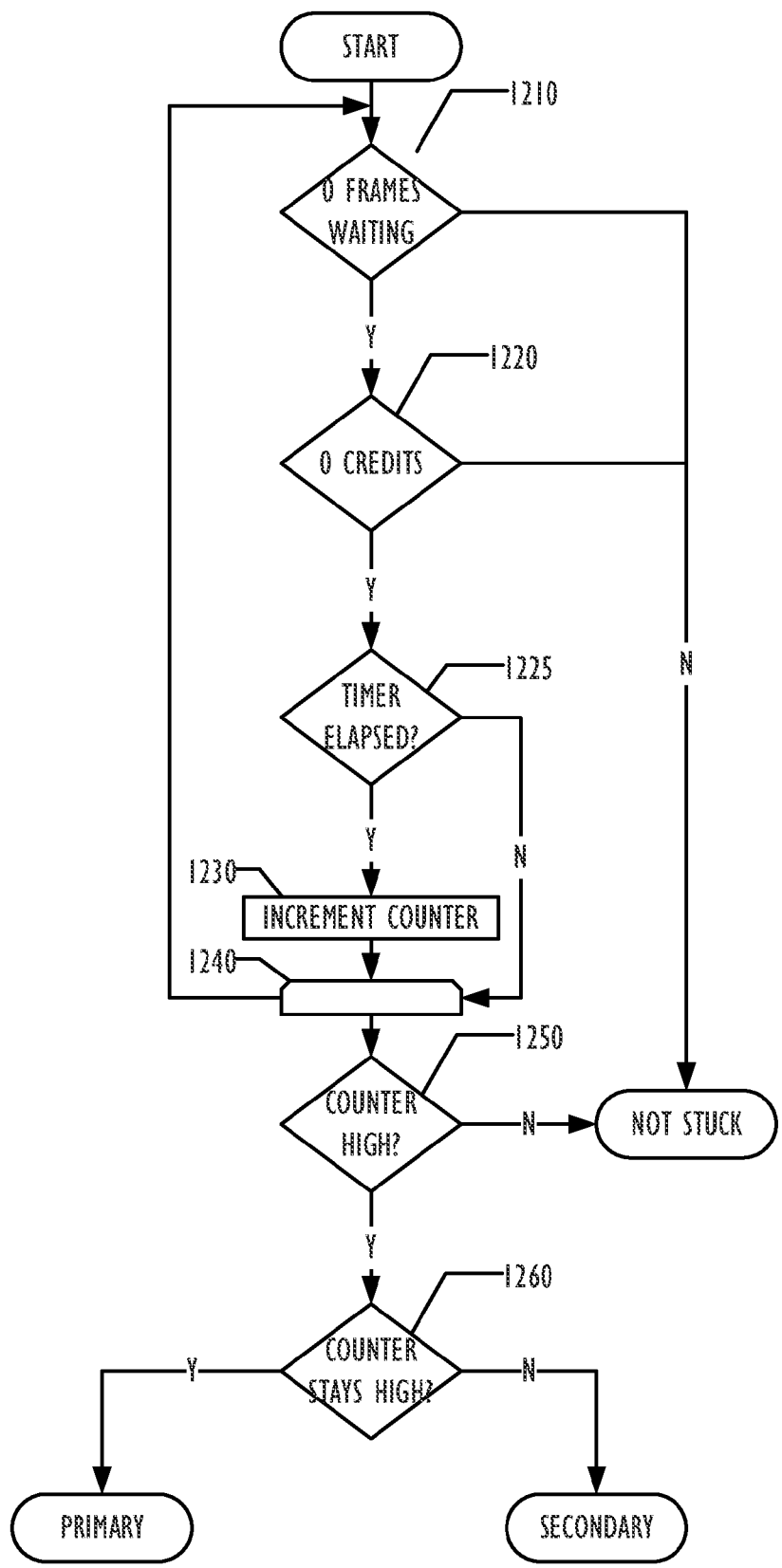
FIG. 12 is flowchart illustrating a technique for detecting stuck virtual channels according to another embodiment.

FIG. 12 is a flowchart illustrating the above embodiment. In block 1210, the ASIC checks to see if any frames are waiting for transmission. If no frames are waiting, the VC is not stuck. In block 1220, the ASIC checks whether any transmission credits are available. If any credits are available, the VC is not stuck. If 0 credits are available, then if the suppression timer has elapsed, as determined in block 1225, the ASIC increments a counter of transmission credit zero events. In block 1240, the ASIC repeats the actions of block's 1210-1230. In block 1250, the software queries the transmission credit zero events counter maintained by the ASIC. If the counter has a very high value, as described above, then the VC is either a primary or secondary stuck VC. In block 1260, if the counter remains high over a frame hold period, the stuck VC is a primary stuck VC; otherwise, the VC is a secondary stuck VC.

Although the above has been written in terms of FC virtual channels, the techniques are not so limited. For example, Ethernet-based networking provides techniques for subdividing flows using virtual LANs (VLANs) and priority-based flow control (PFC). Thus, the techniques described above may be used for detecting problems with stuck virtual LANs in lossless networks using IEEE Data Center Bridging.

Detection of Lost Credits

A third manageability tool allows detection of lost credits. In one embodiment, lost credit detection may detect lost credits on the per VC basis for a given port. Each VC is polled every second and has a configurable timeout value, typically 2 seconds. A VC is flagged for lost credits when the transmit credits are 0 (using non-shared credits) or the transmit credits are negative and the borrowable credits are 0 (in a shared credits configuration). If multiple VCs are timed out, the lowest value is taken for that port. If the port's transmit frames counter has not changed in the polling interval and the timeout value has been exceeded, then a lost credit situation is detected, which may cause a recovery actions such as writing a message to a log file or triggering a link reset.

In another embodiment, the trigger for lost credits may detect the loss of fewer than all credits. In the previous embodiment, lost credits are detected when all the credits are lost, but in this embodiment, a single lost credit may trigger lost credit detection. The starting values of the transmit credits for each VC are compared to the current value of the transmit credits for that VC. If the current value is less than the starting value, and no frames are being transmitted, a lost credit is detected for that VC.

Figure 13:
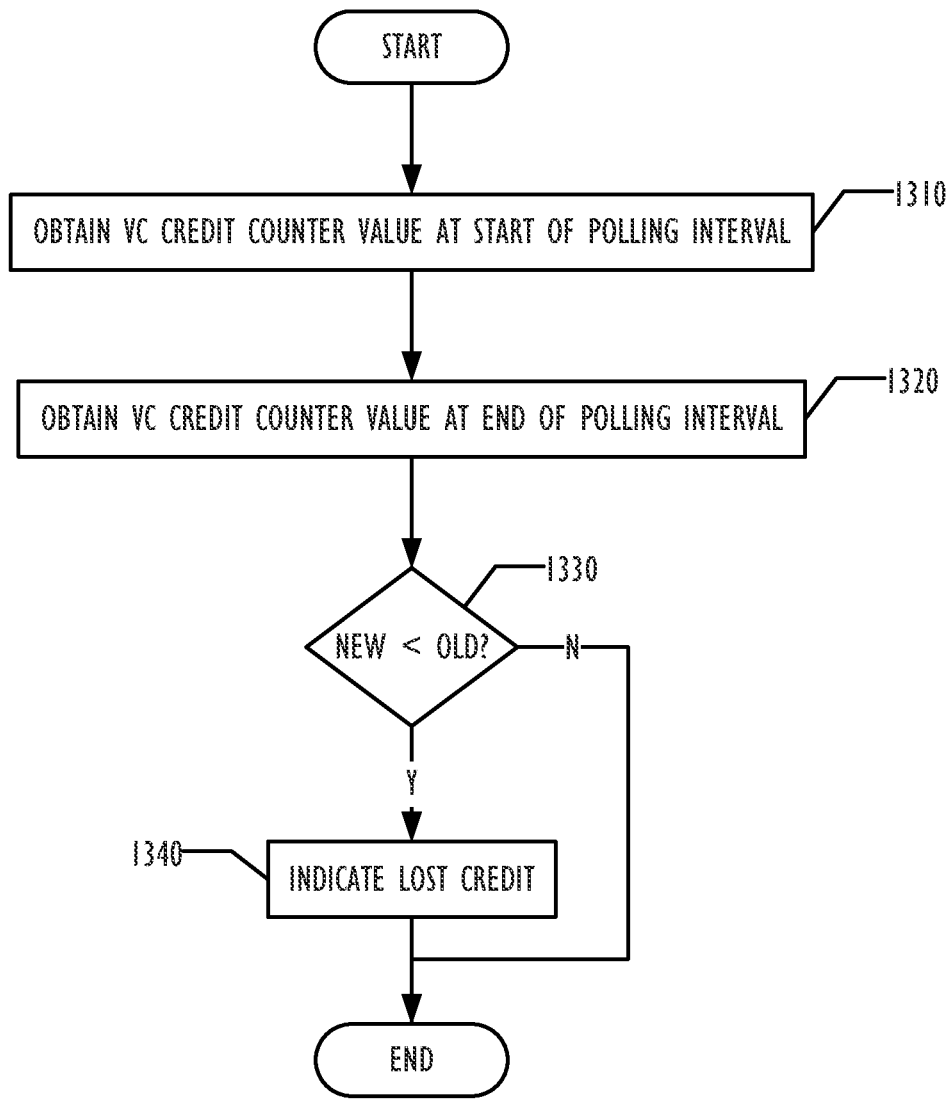
FIG. 13 is a flowchart illustrating a technique for detecting lost credits according to one embodiment.

FIG. 13 is a flowchart illustrating a technique for detecting lost credits according to the above embodiment. In block 1310, the software obtains the transmission credit available counter for the virtual channel at the start of a polling interval. In block 1320, software obtains the transmission credit available counter for the virtual channel at the end of the polling interval. If the value at the end of the polling interval is less than the value at the beginning of the polling interval, as determined in block 1330, then in block 1340, the software indicates detection of a lost credit for that virtual channel.

When lost credits are detected, a mitigation technique may be used to replenish the lost credits. In one embodiment, the ASIC may automatically take a mitigation action to replenish a single lost credit, but not multiple credits. In such an embodiment, software may be used to replenish the multiple lost credits. In other embodiments, the ASIC may automatically take a mitigation action to replenish multiple lost credits.

Mitigation of Slow Drain Bottlenecks—Timeout Adjustment

Yet another manageability tool is a slow drain bottleneck mitigation technique using timeout adjustment, such as by employing a differential edge and core switch hold time variance. The hold time for is the maximum time a frame can wait in the ASIC after it is received on a receive port and before it is delivered to a transit port. If the frame waits in a transmit queue buffer for more than the hold time, the ASIC drops the frame, replenishes the sender's credit, and increments timeout counters on the receive and transmit ports. Such a timeout indicates that the transmit port does not have enough credits in the assigned VC to deliver the frame. This can happen if a slow draining device or a rogue device does not return the credits fast enough. Other reasons for a timeout may include a congestion bottleneck in the fabric.

Figure 5:
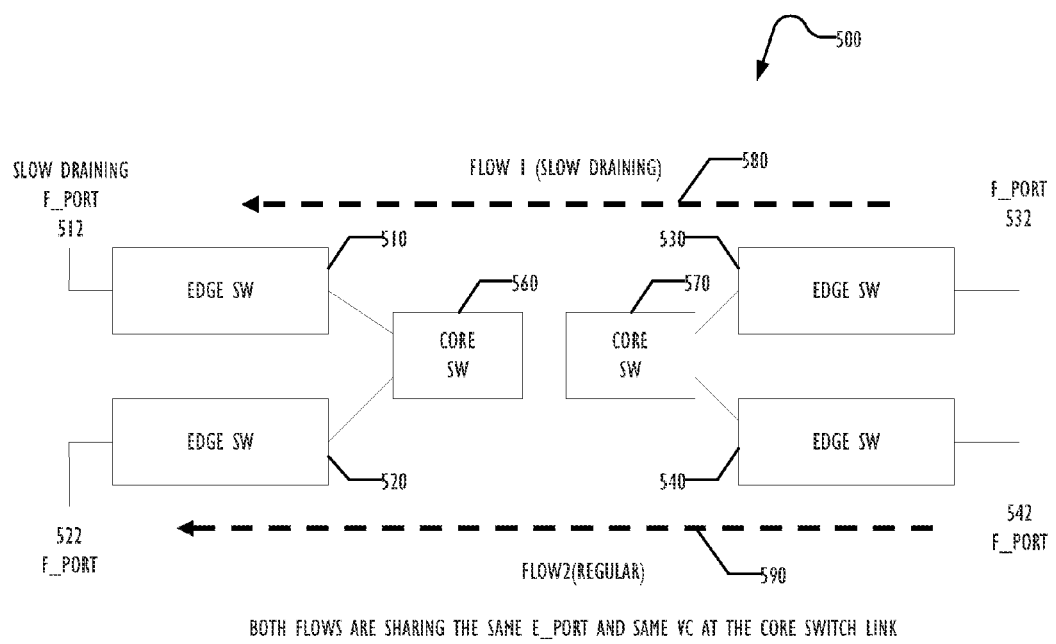
FIG. 5 is a block diagram illustrating a switch network in which edge and core switch hold times vary according to one embodiment.

Frames destined for a slow-draining device can timeout in any of the switches in the fabric that are participating in that flow. When the frames are timed out in any of the core switches, the core switch can drop frames for other flows that are sharing the same ISL and VC. FIG. 5 is a block diagram that explains an example scenario. Flow 580 is traffic between F_port 532 of edge switch 530 and F_port 512 of edge switch 510. Flow 590 is traffic between F_port 542 of edge switch 540 and F_port 522 of edge switch 520. Flows 580 and 590 share the same VC between core switches 560 and 570. In this example, F_port 512 is slow draining, causing timeouts at one or both of core switches 560 and 570. The result is dropped frames not just in flow 580, but also in flow 590, even though F_port 522 and F_port 542 are not talking to the slow draining device attached to F_port 512. By moving the timeouts away from core switches 560 and 570, and to the edge switch 512, credits are replenished at the core switches 560 and 570, and flow 590 can continue, even if at a slower rate.

Although FIG. 5 illustrates a simple switch fabric with two pairs of edge switches and two core switches, fabrics that are more complex may exhibit the same problems and employ similar solutions. For example, in some fabrics, more than two levels of switches may be present, with edge switches such as are illustrated in FIG. 5 connected to director-class platforms that provide one or more director core switch units and director edge switch units in a single unit, thus creating a three-level fabric. Mitigation of slow drain bottlenecks may be desirable in such a fabric at the director for ease of managing the entire fabric centrally instead of at potentially widely separated locations or may be employed at the edge switches to affect as little of the entire fabric as possible.

When a slow drain bottleneck is detected, one approach to mitigating the slow drain is to cause the flow to timeout frames faster than normal, typically towards the edge of the fabric. One way of causing that to occur is to modify or adjust the hold time affecting that flow, however, any technique that causes frames to timeout faster than normal may be used.

In one embodiment, tuning of parameters in the ASICs of the various switches may achieve the desired result. In most systems, the F_ports are connected to edge switches and the core switches are used to connect the edge switches. To reduce the drop counts at the core switches 560 and 570, the hold time for edge switches may be reduced below the hold time for the core switches. Thus, the life of frames is shorter at the edge switches 510, 520, 530, and 540, allowing credits to be replenished as the frames are dropped at the edge of the system 500. The core switches 500 gets their respective credits replenished before the frames timeout. Thus all of the flows can make progress, even if they share the same VC and ISL between 2 or more core switches 560 and 570. In one embodiment, the ASIC will use an edge hold time variable for setting the hold time for the ASIC when the first F_port for the ASIC comes online. When the last F_port for that ASIC goes off-line, the hold time may be set back to the default hold time.

Although described above as affecting the hold time on edge switches, in one embodiment, instead of setting the hold time on all edge switches, the hold time may be modified on a specific switch (which may not be an edge switch) in a path through which the flow passes.

Figure 14:
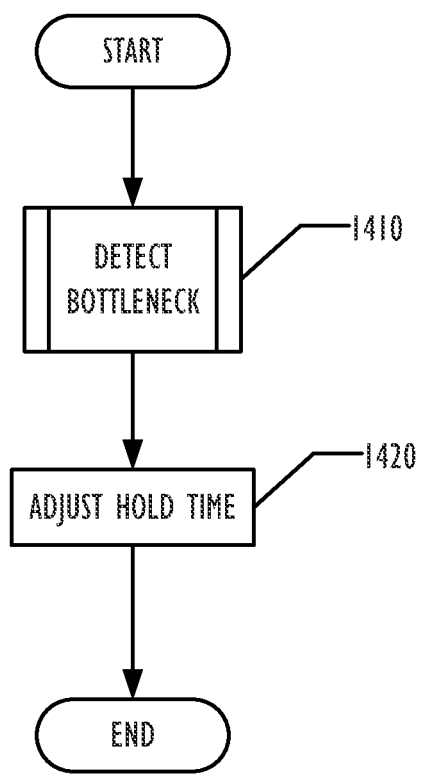
FIG. 14 is a flowchart illustrating a technique for mitigating slow drain bottlenecks according to one embodiment.

FIG. 14 is a flowchart illustrating one embodiment of this technique. In block 1410, a bottleneck is detected using techniques such as are described above. In block 1420, the hold time for a switch in the fabric is adjusted downward to push timeouts toward that switch. Typically, this will be an edge switch, but where more than two levels of switches are employed, similar techniques may be used to cause the flow to timeout frames faster than normal at any level of the switch fabric, by varying the hold time at an edge switch or at a switch at any one or more levels of switches in the fabric.

In one embodiment, the software provides a way for a user to configure the edge switch hold time by way of a CLI command. Other interfaces for configuring the edge hold time may be used.

In one embodiment, the software generates alerts when mitigation is employed, using any desired alerting technique, including writing to log files, generating SNMP traps, etc.

Although though the above is described in terms of adjusting a hold time on an edge switch to a value lower than the default value, other embodiments may use a similar technique to allow adjusting a hold time for non-edge switches to a value higher than a default value. Either technique causes frames to timeout towards the edge of the fabric, to maximize the benefit of the mitigation while reducing the effect of the mitigation on the fabric as a whole.

The above description is written in terms of F_ports, but in one embodiment FL_ports may also be affected by setting the hold time on edge switches to a lower non-default value. In one embodiment, the default hold time for switches may be set to 500 ms and the hold time for edge switches may be set to a value in the range 100 ms to 500 ms.

In one embodiment, the hold time is set for the entire ASIC, and affects all F and FL ports on that ASIC. In a further embodiment, the hold time may be modified on an individual port of the switch. In yet a further embodiment, the hold time may be modified on an individual VC of a port on the switch. By limiting the effect of the mitigation, other flows through other VCs on a port, through other ports on the switch, or on other switches beside a specific switch may be unaffected by the mitigation technique.

As with other manageability tools described above, although written in terms of VCs in an FC fabric, the technique of causing earlier timeouts as a way of mitigating a slow-drain bottleneck may be used in other types of lossless networks, such as FCoE fabrics and Ethernet-based networks using IEEE Data Center Bridging.

Slow Drain Bottleneck Mitigation—Queue Flushing

Figure 6:
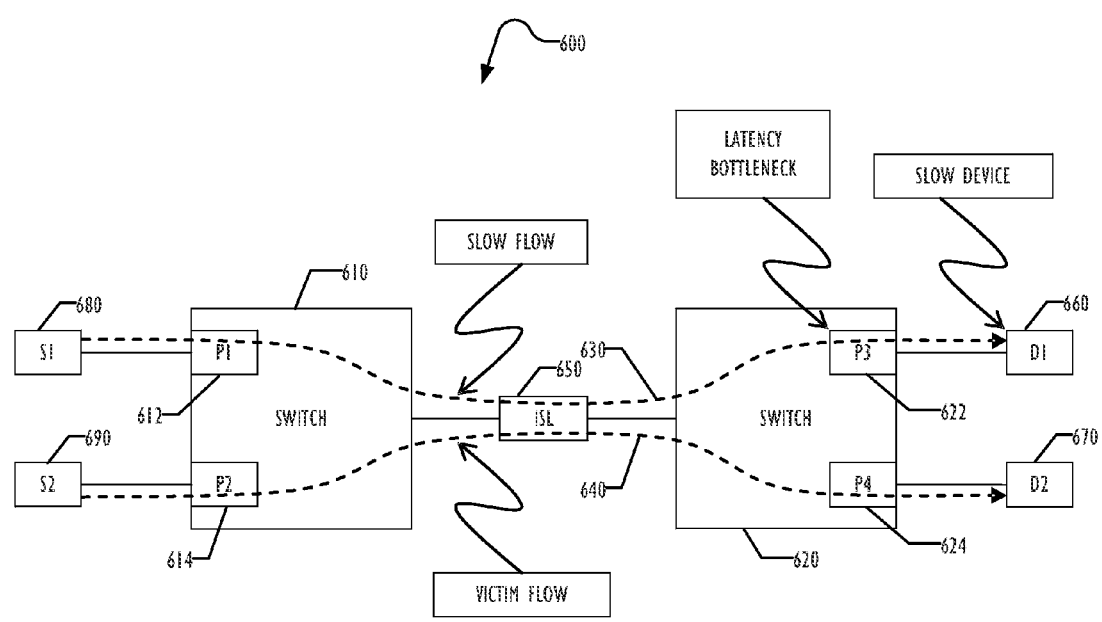
FIG. 6 is a block diagram illustrating a switched network in which latency bottleneck mitigation may be performed according to one embodiment.

Yet another manageability tool provides latency bottleneck mitigation by flushing queues. FIG. 6 is a block diagram illustrating a scenario in which this type of latency bottleneck mitigation may be performed. In this example, two switches (610 and 620) and two flows (630 and 640) are illustrated. Both flows take the same VC over ISL 650. Device 660 is a slow device, meaning that it delays its credit returns into the fabric, causing a latency bottleneck at F_port 622, which causes flow 630 to run at a lower throughput than source 680 desires. Because flow 640 shares credits with flow 630, its throughput between source 690 and destination 670 is also lowered to the same value. In addition, if there are any framed timeouts on switch 610 due to the slowdown, they typically affect victim flow 640 in addition to slow flow 630. Both the reduction in throughput and frame timeouts on the victim flow 640 are undesirable effects of slow flow 660 on victim flow 670.

The bottleneck mitigation technique according to one embodiment continuously flushes the queue at F_port 622, not transmitting frames out of F_port 622 at all, but dropping in F_port 622 all frames destined for device 650. This queue flush mechanism causes VC_RDYs to be sent back from switch 620 to switch 610, one VC_RDY for each dropped frame. The throughput of flow 630 drops to zero, because device 660 does not receive any frames, but the rate at which flow 630 moves from node 680 to switch 620 increases to the maximum possible, as a function of the offered load at switch 610, the offered load at switch 620, and the physical capacity of the path.

As result, the flow 640 is able to move frames just as fast over the ISL 650, improving the throughput going to device 670. The movement of frames may also help reduce the number of timeouts suffered by the flow 640 on switch 610.

In one embodiment, the bottleneck mitigation technique is implemented in the bottleneck detection daemon described above. In other embodiments, bottleneck mitigation may be implemented in a separate daemon or other module of the fabric operating system running on the ASIC.

Figure 7:
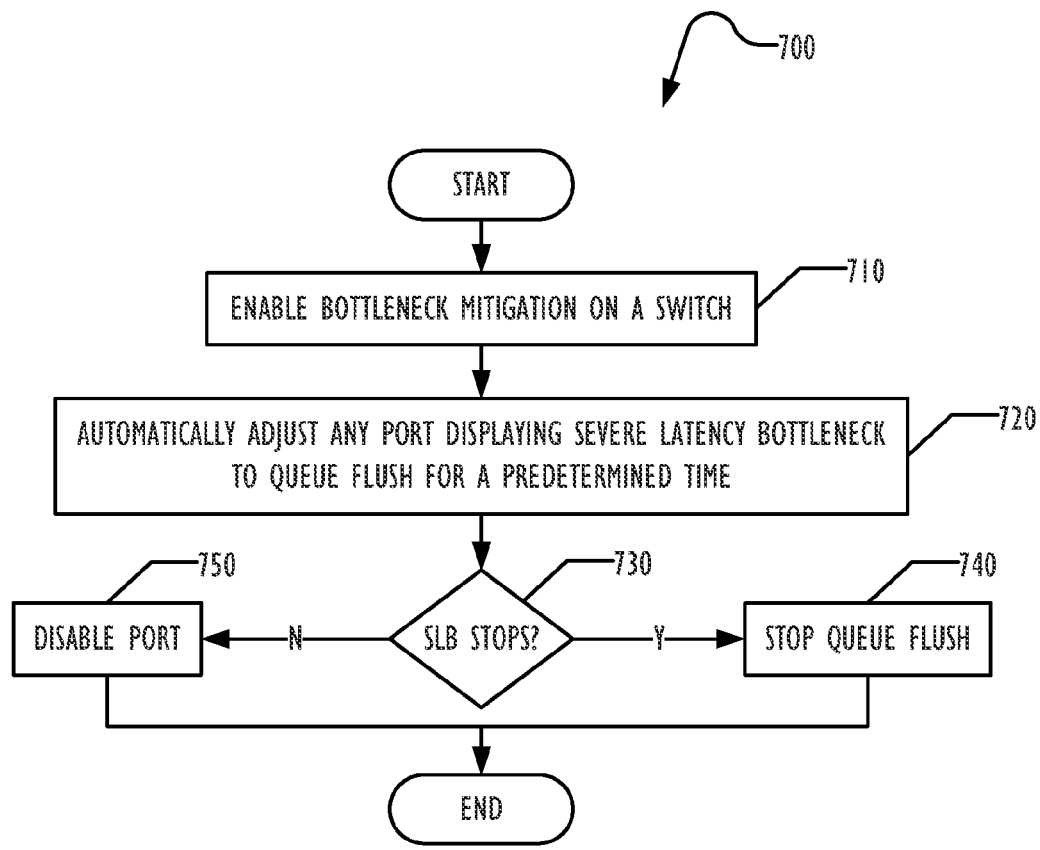
FIG. 7 is a block diagram illustrating a technique for bottleneck mitigation according to one embodiment.

FIG. 7 is a flowchart illustrating a technique for bottleneck mitigation using a queue flush technique according to one embodiment. In block 710, an administrator enables bottleneck mitigation. In embodiments where bottleneck mitigation is implemented as part of the bottleneck detection software, block 710 may be performed when bottleneck detection is enabled. The bottleneck mitigation may be enabled on a per switch basis, and is enabled on all F_ports on that switch; where logical switches may be defined on top of physical switches, each logical switch may be separately enabled.

In block 720, any F_port displaying severe latency bottlenecking may be automatically subjected to queue flush for a predetermined period of time. In some embodiments, this queue flush time period may be configurable.

A severe latency bottleneck in one embodiment is determined to occur when (1) the transmission credit zero counter is incremented by at least a transmission credit zero ratio times the maximum possible number of increments in one second, and (2) the observed inter-frame time is at least an inter-frame time ratio times the theoretical inter-frame time for full throughput at the observed frame size. The observation duration may be 1 second. In one embodiment, the default values for the transmission credit zero ratio may be 0.8 and the default value for the inter-frame ratio may be 100, which is twice the value of the inter-frame ratio used for bottleneck detection as described above, indicating that the bottleneck is severe.

In block 730, at the end of the predetermined time if the severe latency bottleneck has gone away, then the queue flushing may be stopped in block 740 and the flow returned to normal. Otherwise, the port may be disabled in block 750.

In one embodiment, the ASIC provides hardware support for queue flushing, using a per-port bit to signal the ASIC to drop frames trying to egress on that F_port for the predetermined period.

In one embodiment, after the predetermined period elapses an iterative procedure is performed instead of the simple procedure of block 730-750. In this embodiment, after the predetermined flushing period expires, the ASIC automatically returns the port to a normal state. But the software then repeats the determination of block 720, checking the severe latency bottleneck condition again. Regardless of whether a severe latency bottleneck is detected, the software directs the ASIC to enable queue flushing on that port again. If a severe latency bottleneck was detected, the queue flushing time is increased for this iteration. If a severe latency bottleneck was not detected, the software decreases the queue flushing time for this iteration. In one embodiment, increasing the queue flushing time is performed by multiplying the current queue flushing time by a parameter value, while decreasing the queue flushing time is performed by dividing the current queue flushing time by the parameter value. Other techniques for repetitively increasing or decreasing the queue flushing time, including adding or subtracting a value to the current queue flushing time, may be used.

This procedure is repeated until the queue flushing time reaches a high threshold value, at which point the port is disabled, or the queue flushing time reaches a low threshold value, which may be zero, at which point the port is left in the normal state. If either threshold is met, the queue flushing procedure terminates. This repetitive procedure tends to smooth out transitions to and from queue flushing, reducing occurrences of performing queue flushing, setting the flow back to normal, then detecting the problem again and restarting queue flushing.

In one embodiment, the initial queue flushing time is 100 ms and the parameter value for multiplying or dividing the current queue flushing time is 5. The high threshold queue flushing time and the low threshold queue flushing time may also be configurable values, such as 5000 ms and 0 ms, respectively.

Alerts may be provided at various times according to one or more embodiments. For example, an alert may be provided when queue flushing begins on a port, and when bottleneck mitigation terminates either by disabling the port or letting the ports remain in a normal state. These alerts may be provided in any desired form, including writing messages to log file and causing SNMP traps.

An Example Hardware Implementation

Figure 8:
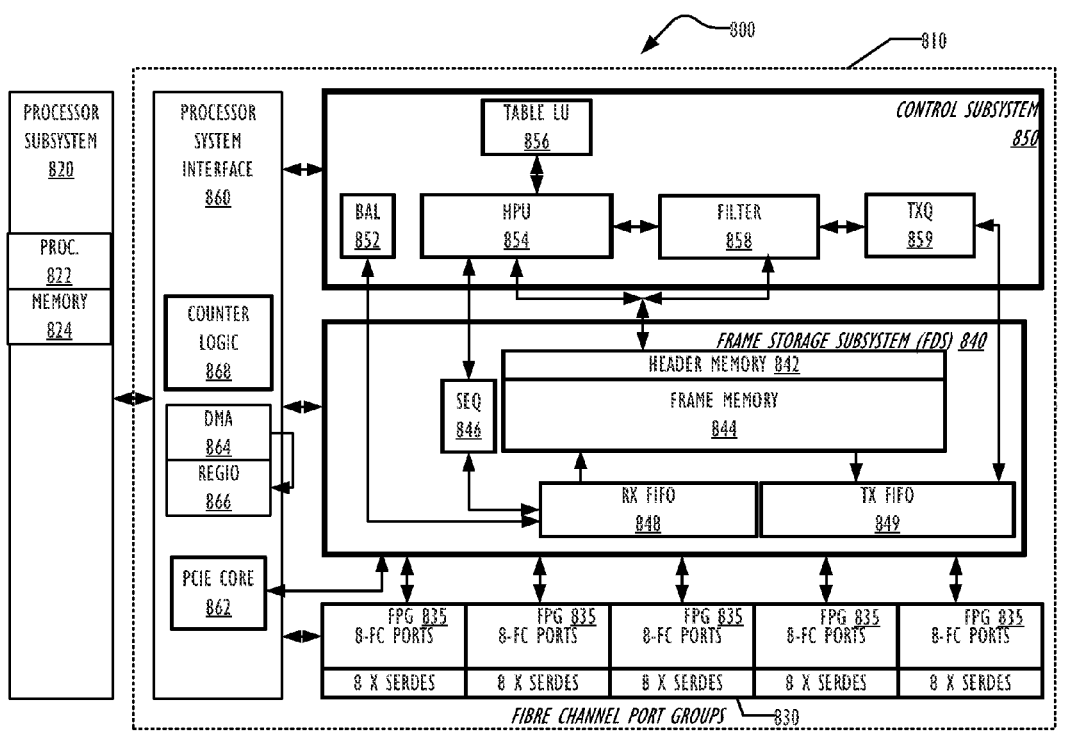
FIG. 8 is a block diagram illustrating a network switch according to one embodiment.

In one embodiment illustrated in FIG. 8, the hardware functionality for the manageability features described above is implemented as a 40-port Fibre Channel switch ASIC 810 that is combinable with a processor subsystem 820 to provide a complete 40-port Fibre Channel network switch 800. Multiple ASICs 810 can be arranged in various topologies to provide higher port count, modular switch chassis. The ASIC 810 and processor subsystem 820 are illustrative and by way of example only, and other hardware implementations can be used as desired.

The ASIC 810 comprises four major subsystems at the top-level as shown in FIG. 8: A Fibre Channel Protocol Group Subsystem 830, a Frame Storage Subsystem 840, a Control Subsystem 850, and a Processor System Interface 860. Some features of the ASIC 810 that are not relevant to the current discussion have been omitted for clarity of the drawing.

The Fibre Channel Protocol Group (FPG) Subsystem 830 comprises 5 FPG blocks 835, each of which contains 8 port and SERDES logic blocks to a total of 40 E, F, and FL ports.

The Frame Data Storage (FDS) Subsystem 840 contains the centralized frame buffer memory and associated data path and control logic for the ASIC 810. The frame memory is separated into two physical memory interfaces: a header memory 842 to hold the frame header and a frame memory 844 to hold the payload. In addition, the FDS 840 includes a sequencer 846, a receive FIFO buffer 848 and a transmit buffer 849.

The Control Subsystem 850 comprises a Buffer Allocation unit (BAL) 852, a Header Processor Unit (HPU) 854, a Table Lookup Unit (Table LU) 856, a Filter 858, and a Transmit Queue (TXQ) 859. The Control Subsystem 850 contains the switch control path functional blocks. All arriving frame descriptors are sequenced and passed through a pipeline of the HPU 854, filtering blocks 858, until they reach their destination TXQ 859. The Control Subsystem 850 carries out L2 switching, FCR, LUN Zoning, LUN redirection, Link Table Statistics, VSAN routing and Hard Zoning.

The Processor System Interface 860 provides the processor subsystem 820 with a programming interface to the ASIC 810. It includes a Peripheral Component Interconnect Express (PCIe) Core 862, a DMA engine 864 to deliver frames and statistics to and from the processor, and a top-level register interface block 866, as well as a counter logic 868 that provides the counters and other values that may be accessed by the software that are described above. As illustrated in FIG. 8, the ASIC 810 is connected to the Processor Subsystem 820 via a PCIe link controlled by the PCIe Core 862, but other architectures for connecting the ASIC 810 to the Processor Subsystem 820 can be used.

Some functionality described above can be implemented as software modules in an operating system or application running on a processor 822 of the processor subsystem 820 and stored in a memory 824 or other storage medium of the processor subsystem 820. This software may be provided during manufacture of the switch chassis 800, or provided on any desired computer-readable medium, such as an optical disc, and loaded into the switch chassis 800 at any desired time thereafter. This typically includes functionality such as the software that allows the creation and management of logical ports that are defined for the ASIC 810 and LISLs to connect logical ports, as well as user interface functions, such as a command line interface for management of the switch chassis 800.

In one embodiment, the control subsystem 850 is configured by operating system software of the network switch 800 executing in the processor 822 of the processor subsystem 820.

Serial data is recovered by the SERDES of an FPG block 835 and packed into ten (10) bit words that enter the FPG subsystem 830, which is responsible for performing 8b/10b decoding, CRC checking, min and max length checks, disparity checks, etc. The FPG subsystem 830 sends the frame to the FDS subsystem 840, which transfers the payload of the frame into frame memory and the header portion of the frame into header memory. The location where the frame is stored is passed to the control subsystem, and is used as the handle of the frame through the ASIC 810. The Control subsystem 850 reads the frame header out of header memory and performs routing, classification, and queuing functions on the frame. Frames are queued on transmit ports based on their routing, filtering and QoS. Transmit queues de-queue frames for transmit when credits are available to transmit frames. When a frame is ready for transmission, the Control subsystem 850 de-queues the frame from the TXQ 859 for sending through the transmit FIFO back out through the FPG 830.

The Header Processor Unit (HPU) 854 performs header HPU processing with a variety of applications through a programmable interface to software, including (a) Layer2 switching, (b) Layer3 routing (FCR) with complex topology, (c) Logical Unit Number (LUN) remapping, (d) LUN zoning, (e) Hard zoning, (f) VSAN routing, (g) Selective egress port for QoS, and (g) End-to-end statistics.

The HPU 854 provides hardware capable of encapsulating and routing frames across inter-switch links that are connected to the ports 835 of the ASIC 810, including the transport of logical ISL frames that are to be sent across an XISL. The HPU 854 performs frame header processing and Layer 3 routing table lookup functions using routing tables where routing is required, encapsulating the frames based on the routing tables, and routing encapsulated frames. The HPU 854 can also bypass routing functions where normal Layer2 switching is sufficient.

Thus, the ASIC 810 can use the HPU 854 to perform the encapsulation, routing, and decapsulation, by adding or removing headers to allow frames for a LISL to traverse an XISL between network switches as described above at hardware speeds.

CONCLUSION

By employing manageability tools such as are described above, an administrator of a lossless network may improve the reliability and performance of the network, detecting and mitigating bottlenecks, detecting stuck VCs and loss of credits, allowing the administrator better control over the network.

Although described above generally in terms of FC fabrics and using FC terminology, the problems and techniques for detecting and mitigating those problems are not limited to FC fabrics and protocols. Slow drain and congestion bottlenecks, for example, may occur and need mitigation using similar techniques to those described above in FCoE, Ethernet, and other types of networks, including lossless networks using IEEE Data Center Bridging. Similarly, as described above, the techniques described in terms of VCs may be used in other contexts, such as in an Ethernet network using VLANs and PFC.

It is to be understood that the above description is intended to be not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A network switch, comprising:
a port configured to transmit data;
a processor, coupled to the port; and
software, executed by the processor, comprising:
  logic to detect that a virtual channel associated with the port is stuck, comprising
    logic to determine that there are zero transmission credits for the stuck virtual channel at the end of an observation period or that more than a predetermined number of transmission credit zero events has occurred during the observation period; and
  logic to report the stuck virtual channel.

2. The network switch of claim 1,
wherein the logic to detect a stuck virtual channel further comprises:
  logic to determine that zero bytes were transmitted on the stuck virtual channel during the observation period.

3. The network switch of claim 1, wherein the predetermined value approximates a maximum possible number of transmission credit zero events that can occur in an observation period.

4. The network switch of claim 3, wherein the observation period is longer than a maximum time a frame for the port is held before being dropped.

5. The network switch of claim 1, further comprising:
a counter of transmission credit zero events associated with the stuck virtual channel a counter of transmission credits available to the stuck virtual channel;
a counter of frames waiting for transmission on the stuck virtual channel; and
logic to increment the transmission credit zero events counter when a first condition exists, the first condition comprising:
  the counter of frames waiting for transmission on the stuck virtual channel is positive; and
  the counter of transmission credits available to the stuck virtual channel is zero.

6. The network switch of claim 5, further comprising:
a programmable suppression time indicator, and
wherein the logic to increment the transmission credit zero events counter suppresses incrementing the transmission credit zero events counter for an amount of time indicated by the programmable suppression time indicator after the first condition exists.

7. The network switch of claim 1, wherein the logic for reporting a stuck virtual channel comprises:
logic to write a message to a log file responsive to the logic to detect the stuck virtual channel.

8. The network switch of claim 7, wherein the logic for reporting a stuck virtual channel comprises:
logic to throttle the logic to write a message to the log file for the port.

9. The network switch of claim 1, wherein the software further comprises:
logic to disable the logic to detect the stuck virtual channel.

10. The network switch of claim 1, wherein the software further comprises:
logic to detect a lost transmission credit for the virtual channel.

11. The network switch of claim 10, wherein the logic to detect a lost transmission credit for the virtual channel comprises:
logic to compare a count of available transmission credits for the virtual channel at the start of an observation period with the count of available transmission credits for the virtual channel at the end of the observation period, wherein no frames were transmitted during the observation period on the virtual channel; and
logic to report a lost credit responsive to the logic to compare.

12. A non-transitory computer readable medium with instructions stored thereon, the instructions comprising instructions for execution by a network switch to cause the network switch to:
detect that a virtual channel associated with a port of a network switch is stuck if a predetermined number of transmission credit zero events occurred on the virtual channel during an observation period;
detect that the virtual channel is stuck if there are zero transmission credits available for the virtual channel at the end of the observation period; and
report the stuck virtual channel.

13. The method of claim 12, wherein the instructions further comprise instructions for causing the network switch to:
determine that zero bytes were transmitted on the virtual channel during the observation period.

14. The method of claim 13, wherein the predetermined number of transmission credit zero events approximates a maximum possible number of transmission credit zero events that can occur during the observation period.

15. The method of claim 14, wherein the instructions that cause the network device to detect that a virtual channel associated with a port of the network switch is stuck if a predetermined number of transmission credit zero events has occurred on the virtual channel during the observation period comprise instructions for causing the network switch to:
increment a transmission credit zero event counter if there are frames waiting for transmission on the stuck virtual channel at the end of the observation period and there are zero transmission credits available to the virtual channel on the port.

16. The method of claim 14, wherein the instructions further comprise instructions for causing the network switch to:
suppress incrementing a counter of transmission credit zero events for a programmable suppression time after a transmission credit zero event.

17. The method of claim 14, wherein the observation period is longer than a maximum time a frame is held by the network switch before being dropped.

18. The method of claim 12, wherein the instructions for causing the network switch to report the stuck virtual channel comprise instructions for causing the network switch to:
   write a message to a log file responsive to the act of detecting a stuck virtual channel.

19. The method of claim 12, wherein the instructions further comprise instructions for causing the network switch to:
   throttle reporting the stuck virtual channel.

20. The method of claim 12, wherein the instructions further comprise instructions for causing the network switch to:
   disable detecting a stuck virtual channel on the port.

21. The method of claim 12, wherein the instructions further comprise instructions for causing the network switch to:
   detect a lost transmission credit for the virtual channel by comparing a counter of transmission credits available to the virtual channel at the start and at the end of an observation period during which no frames were transmitted on the virtual channel; and
   report a lost transmission credit for the virtual channel responsive to the act of detecting a lost transmission credit.

* * * * *